Jan. 9, 1940.　　　　　W. H. ROLL　　　　2,186,126
MOWING MACHINE
Filed Oct. 8, 1937　　　　2 Sheets-Sheet 1
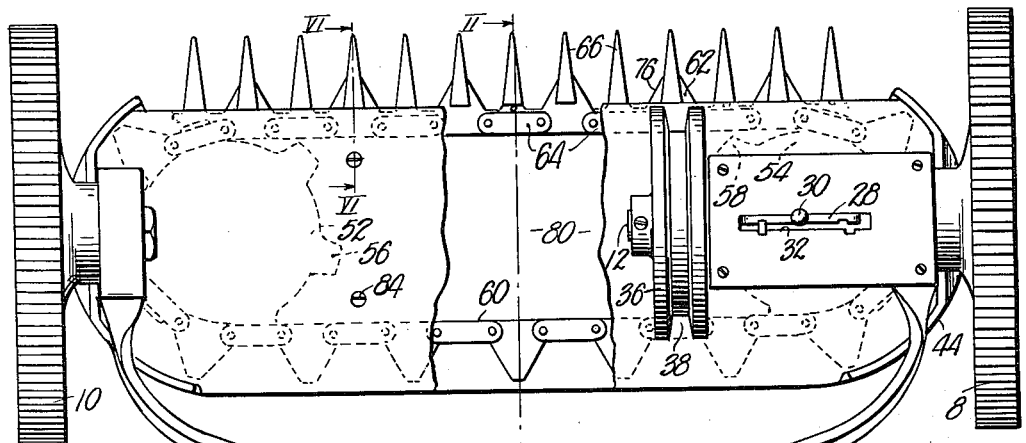
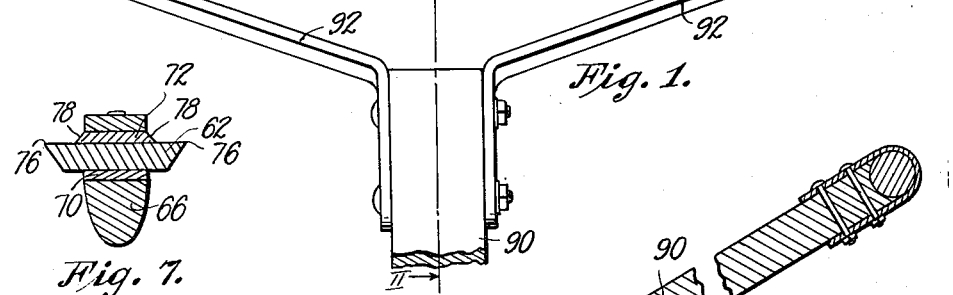
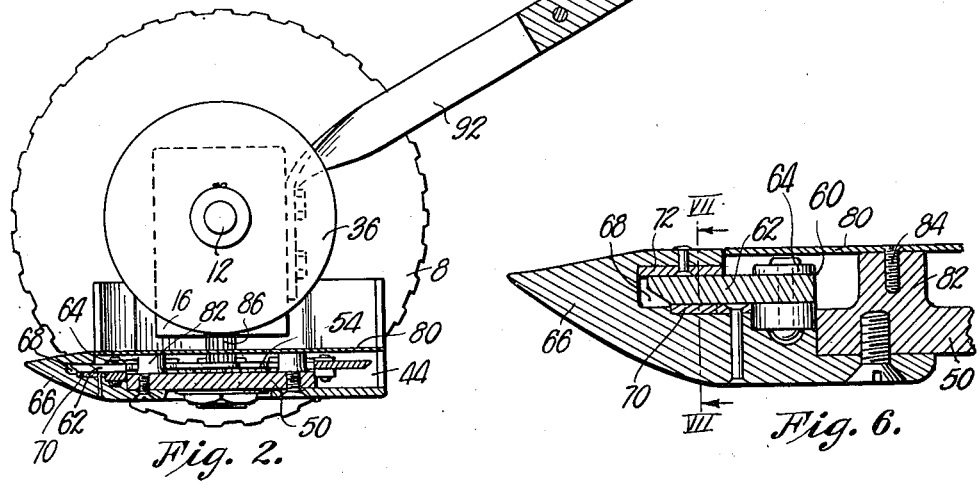
INVENTOR,
Walter H. Roll.
BY Hovey & Hamilton,
ATTORNEYS.

Jan. 9, 1940.  W. H. ROLL  2,186,126

MOWING MACHINE

Filed Oct. 8, 1937  2 Sheets-Sheet 2

INVENTOR,
Walter H. Roll.
BY
Hovey & Hamilton
ATTORNEYS.

Patented Jan. 9, 1940

2,186,126

UNITED STATES PATENT OFFICE 2,186,126

MOWING MACHINE

Walter H. Roll, Linden, N. J.

Application October 8, 1937, Serial No. 167,883

7 Claims. (Cl. 56—244)

This invention relates to improvements in mowing machines of the hand propelled or small motor driven type, and the primary object of the invention is to provide such a machine wherein is embodied uniquely disposed cutting elements that may be driven through an endless circumscribing path in either direction and which may be adjusted toward or from the supporting surface in a quick and easy manner.

One of the important objects of the invention is the provision of a mowing machine with an endless chain cutter that is positioned in a horizontal plane and close to the ground where the severed portions of the grass may pass rearwardly over the said cutter and between the supporting wheels of the mowing machine, the space between said wheels being unrestricted so as to prevent clogging and insure efficient operation of the entire structure.

The yet further aim of this invention is to provide a mowing machine with specially formed cutter blades, the cutting edges of which are disposed at the top thereof so that a special shearing action may take place between the cutter blades and guard fingers that will insure speedy evacuation of the severed particles of grass from the zone of severance in order to preclude objectionable clogging, which would effect the efficiency of the cutting elements of the machine.

A still further aim of the present invention is to provide a mowing machine with specially disposed supporting wheels which carry stub shafts, one of which is provided with a fly-wheel that has an annular groove therein for the reception of a power driven belt in the event the mowing machine is to be equipped with an engine or the like.

Further aims of this invention include the novel combination of parts which afford means for adjusting the endless chain cutter while that chain is maintained in driving connection with one of the stub shafts of the machine.

The foregoing and a large number of other objects, will be made clear during the course of the following specification, referring to the accompanying drawings wherein:

Figure 1 is a top plan view of a mowing machine made to embody the present invention.

Fig. 2 is a vertical, cross-section view through the same taken on line II—II of Fig. 1 and moving in the direction of the arrow.

Fig. 6 is an enlarged fragmentary detailed sectional view through one of the guard fingers and forward stretch of the endless chain cutter taken on line VI—VI of Fig. 1 and, Fig. 7 is a detailed sectional view taken on line VII—VII of Fig. 6.

Figure 3:
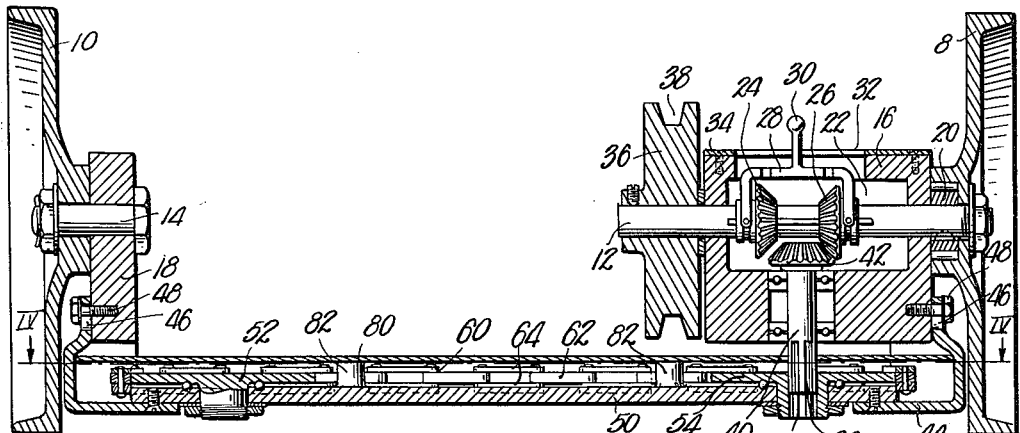
Fig. 3 is a vertical, central longitudinal sectional view through the mowing machine.
Figure 4:
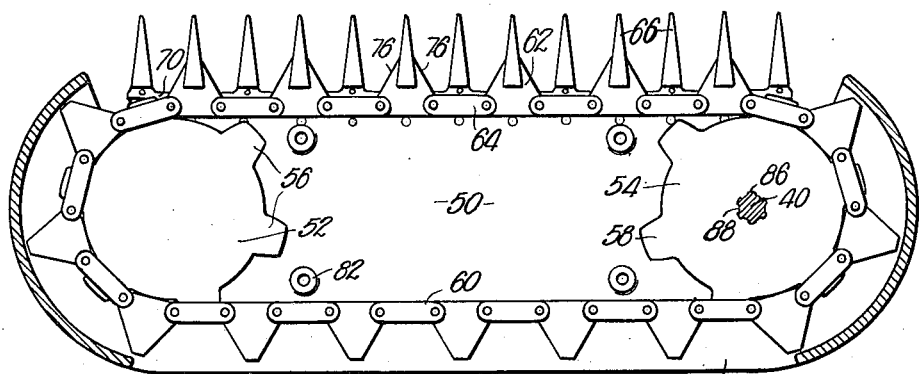
Fig. 4 is a horizontal cross-sectional view through the machine taken on line IV—IV of Fig. 3.

One illustrated embodiment of a mowing machine having the invention included therein, is shown in the drawings and comprises a pair of opposite supporting wheels 8 and 10, each of which carries a stub shaft 12 and 14 respectively, which are journaled in bearing blocks 16 and 18. Supporting wheels 8 and 10 may be of the conventional metal type or they may be equipped with the more modern tread in the form of a rubber tire not here shown.

Wheel 10 idles upon stub shaft 14 and does not serve as a driving medium in any way whatsoever. Supporting wheel 8 has connection with stub shaft 12 however, through the medium of the conventional assembly of elements 20, which permits free rotation of wheel 8 about shaft 12 in one direction, yet when wheel 8 is rotated in the other direction, shaft 12 will be clutched and caused to rotate therewith. Such elements in a mowing machine are well-known in the art and an example of this structure is illustrated in U. S. Letters Patent No. 467,222, dated Jan. 19, 1892.

Bearing block 16 which houses a portion of the length of shaft 12, is hollow to present a cavity 22 that houses a pair of bevel gears 24 and 26 respectively. These gears are splined on shaft 12 and therefore are moveable longitudinally therealong when yoke 28 is manually manipulated. A handle 30 extended through slot 32 of cover 34 is conveniently located so that the operator of the machine might shift gears 24 and 26 as desired.

A fly-wheel 36 is mounted on stub shaft 12 and provided with an annular groove 38. This fly-wheel insures a smooth running mechanism and the annular groove 38 presents means whereby a motor, engine, or other source of power, may be joined to the driving mechanism of the mowing machine through the medium of a belt not here shown.

Shaft 12 serves as a drive shaft and is horizontally disposed as plainly illustrated in Fig. 3. A vertically driven shaft 40 is journaled for rotation in bearing block 16 and has a bevel gear 42 mounted in one end thereof. This bevel gear remains in place while gears 24 and 26 are moved alternately to and from engagement with gear 42. Obviously when gear 24 is moved into mesh with gear 42, the direction of rotation of shaft 40 will be reversed from the direction of rotation set up when gear 26 was in mesh with gear 42.

Figure 5:
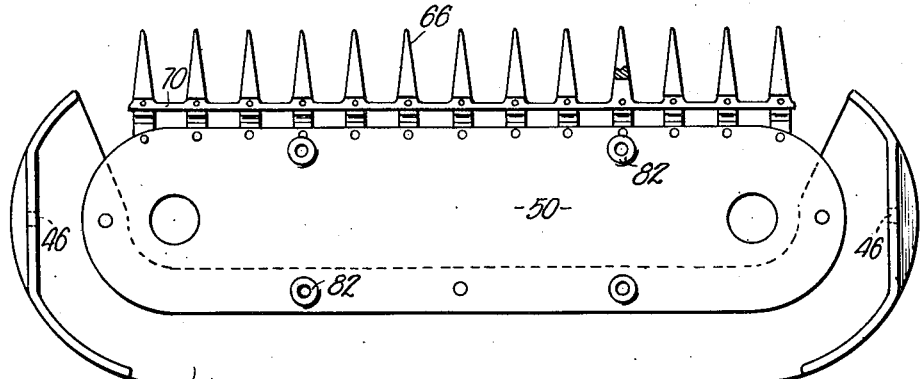
Fig. 5 is a top plan view of the hanger plate and guard fingers showing the same entirely removed from the machine.

A hanger plate 44 depends from bearing blocks 16 and 18. The form of this bearing plate 44 is best shown in Fig. 5, and the up-turned ends thereof, are provided with slots 46 through which machine bolts 48 may pass into engagement with the respective bearing block to the end that hanger plate 44 may be moved toward and from the supporting surface.

A horizontal plate 50 is secured to hanger plate 44 and carries sprockets 52 and 54 in a way which permits their rotation. These sprockets 52 and 54 are in a horizontal plane and have teeth 56 and 58 respectively, that engage the endless chain cutter 60. This cutter is made up of a series of triangular cutter blades 62, secured together by links 64. Blade 62 and links 64 cooperate to present an endless chain which passes around sprocket wheels 52 and 54, and to present a normally forward stretch between said wheels which cooperates with guard fingers 66 in cutting the grass. These guard fingers 66 are slotted as at 68 and blades 62 travel through the slots.

A hardened plate 70 may be used to face the surface of fingers 66 which supports blades 62, and a hardened plate 72 may be secured to each finger 66 within slot 68 above blades 62 so as to cooperate with the inclined converging edges 64 thereof in establishing a shearing action.

Fig. 7 clearly indicates the manner in which each blade 62 is sharpened. A cutting edge 76 is formed along the line of connection between the upper face of blade 62 and the inclined size thereof. Plate 72 is likewise provided with inclined edges 78 so that very sharp cutting elements are presented.

A shield 80 supported by plate 50 through the medium of spacers 82 and screws 84 are analogous means, precludes the severed portions of the grass from falling upon chain 60 and serves as a guide to direct the said severed portions rearwardly between wheels 8 and 10, and the absence of mechanism between these wheels is one of the important features of this structure.

Sprocket 54 and vertically driven shaft 50 are provided with slots and integral keys 86 and 88 that are complementary and inter-engaged as detailed in Fig. 3, thus, longitudinal movement of sprocket 54 along shaft 40 is permitted while any rotary movement of shaft 40 is imparted to sprocket 54. Adjusting hanger plate 44 toward and from the supporting surface will merely slide sprocket 54 along shaft 40.

The endless chain comprising blades 62 and lengths 64, may be held taut through the conventional expedient of mounting sprocket 52 in a slidable block so as to allow adjustment toward and from the other sprocket 54.

The conventional operating handle secured to bearing blocks 16 and 18 by fixtures 92 completes the assembly.

Gear ratio governing the speed of chain 60 may be altered to suit conditions and the desire of the operator. A construction of blades 62 and companion parts however, insures efficient operation at very high speeds and when one cutting edge 76 of blades 62 is dulled, shifting of gears 24 and 26 will merely reverse the direction of travel of chain 60 so that the other cutting edge 76 is utilized.

Mowing machines having different appearances than the one illustrated and described, may be made to embody the invention and while the preferred form has been shown and set down in detail, it is desired to be limited only by the spirit and scope of the appended claims.

Having thus described the invention, what is claimed as new and desired to be secured by Letters Patent is:

1. In a mowing machine of the character described having a pair of supporting wheels adapted to roll over a supporting surface, a stub shaft carried by each wheel respectively, and a bearing block on each stub shaft; a horizontal hanger plate carried by the bearing blocks for vertical adjustment toward and from the supporting surface, a pair of sprocket wheels on the hanger plate; an endless chain cutter extending around the sprocket wheels; a series of slotted guard fingers formed on the hanger plate along one stretch of the cutter; a driven shaft engaging one of the sprocket wheels provided with a bevel gear and journaled in one of said bearing blocks; a bevel gear splined on the stub shaft adjacent to and above said driven shaft in mesh with the bevel gear on the driven shaft; and means for moving the bevel gear on the stub shaft to and from said meshed position.

2. In a mowing machine of the character described having a pair of supporting wheels adapted to roll over a supporting surface, a stub shaft carried by each wheel respectively, and a bearing block on each stub shaft; a horizontal hanger plate carried by the bearing blocks for vertical adjustment toward and from the supporting surface, a pair of sprocket wheels on the hanger plate; an endless chain cutter extending around the sprocket wheels; a series of slotted guard fingers formed on the hanger plate along one stretch of the cutter; a driven shaft engaging one of the sprocket wheels provided with a bevel gear and journaled in one of said bearing blocks; a bevel gear splined on the stub shaft adjacent to and above said driven shaft in mesh with the bevel gear on the driven shaft; and means for moving the bevel gear on the stub shaft to and from said mesh position, said bevel gears being housed within said bearing block.

3. In a mowing machine of the character described having a pair of supporting wheels adapted to roll over a supporting surface, a stub shaft carried by each wheel respectively, and a bearing block on each stub shaft; a horizontal hanger plate carried by the bearing blocks for vertical adjustment toward and from the supporting surface, a pair of sprocket wheels on the hanger plate; an endless chain cutter extending around the sprocket wheels; a series of slotted guard fingers formed on the hanger plate along one stretch of the cutter; a driven shaft engaging one of the sprocket wheels provided with a bevel gear and journaled in one of said bearing blocks; a bevel gear splined on the stub shaft adjacent to and above said driven shaft in mesh with the bevel gear on the driven shaft; a fly-wheel and means for moving the bevel gear on the stub shaft to and from said mesh position, said bevel gears being housed within said bearing block, said stub shaft having the fly-wheel mounted thereon.

4. In a mowing machine of the character described having a pair of supporting wheels adapted to roll over a supporting surface, a stub shaft carried by each wheel respectively, and a bearing block on each stub shaft; a horizontal hanger plate carried by the bearing blocks for vertical adjustment toward and from the supporting surface, a pair of sprocket wheels on the hanger plate; an endless chain cutter extending around the sprocket wheels, a series of slotted guard fingers formed on the hanger plate along one stretch of the cutter; a driven shaft engaging one of the sprocket wheels provided with a bevel gear and journaled in one of said bearing blocks; a bevel gear splined on the stub shaft adjacent to and above said driven shaft in mesh with the bevel gear on the driven shaft; and means for moving the bevel gear on the stub shaft to and from said meshed position, said endless chain cutter being between the said supporting wheels and provided with an overlying shield whereby the severed lengths of grass may pass to positions rearwardly of the mowing machine during normal operation.

5. In a mowing machine having a pair of spaced apart supporting wheels adapted to roll over a supporting surface, and an endless chain cutter having a plurality of articulated blades disposed in a horizontal plane between said wheels close to the supporting surface; drive means for the chain cutter comprising a stub shaft rotatable by one of said wheels and extending inwardly therefrom toward the other wheel; a fly wheel on the stub shaft at the inner end thereof; a gear on the stub shaft between the said one wheel and said fly wheel; a vertical shaft having a gear on the upper end thereof in mesh with said gear on the stub shaft; and a sprocket on the lower end of the vertical shaft in engagement with said endless chain cutter.

6. In a mowing machine having a pair of supporting wheels adapted to roll over a supporting surface, an endless chain cutter having a plurality of articulated blades disposed in a horizontal plane between said wheels close to the supporting surface, and a vertically adjustable hanger plate to carry the cutter in a predetermined position in spaced relation to the supporting surface, drive means for the chain cutter comprising a stub shaft rotatable by one of said wheels and extending inwardly therefrom toward the other wheel above the endless chain cutter; a fly wheel on the stub shaft at the inner end thereof; a gear on the stub shaft between the said one wheel and said fly wheel; a vertical shaft having a gear on the upper end thereof in mesh with said gear on the stub shaft; and a sprocket on the lower end of the vertical shaft in engagement with said endless chain cutter, said sprocket wheel and the vertical shaft having complementary interengaging keys and key-ways permitting movement of the sprocket along said vertical shaft as the hanger plate and endless chain cutter are moved toward and from the supporting surface.

7. In a mowing machine having a pair of supporting wheels adapted to roll over a supporting surface, an endless chain cutter having a plurality of articulated blades disposed in a horizontal plane between said wheels close to the supporting surface, and a vertically adjustable hanger plate to carry the cutter in a predetermined position in spaced relation to the supporting surface, drive means for the chain cutter comprising a stub shaft rotatable by one of said wheels and extending inwardly therefrom toward the other wheel above the endless chain cutter; a fly wheel on the stub shaft at the inner end thereof; a pair of bevel gears splined on the stub shaft between the said one wheel and said fly wheel; a vertical shaft having a bevel gear on the upper end thereof between said gears on the stub shaft; manually operable means for moving the pair of bevel gears along the stub shaft for selective engagement with the bevel gear on the vertical shaft; a sprocket on the lower end of the vertical shaft in engagement with said endless chain cutter, said sprocket wheel and the vertical shaft having complementary interengaging keys and key-ways permitting movement of the sprocket along said vertical shaft as the horizontal plate and endless chain are moved toward and from the supporting surface.

WALTER H. ROLL.